United States Patent
Tani et al.

(10) Patent No.: US 9,884,504 B2
(45) Date of Patent: Feb. 6, 2018

(54) REAR FACE SIDE SUBSTRATE FOR THERMAL TRANSFER IMAGE-RECEIVING SHEET, AND THERMAL TRANSFER SHEET

(71) Applicants: Dai Nippon Printing Co., Ltd., Tokyo (JP); Mitsui Chemicals Tohcello, Inc., Tokyo (JP)

(72) Inventors: Masayuki Tani, Tokyo (JP); Koji Yamamuro, Tokyo (JP); Shinji Kometani, Tokyo (JP); Hiroshi Honda, Koga (JP); Tetsuji Tenma, Koga (JP)

(73) Assignees: Dai Nippon Printing Co., Ltd., Shinjuku-Ku (JP); Mitsui Chemicals Tohcello, Inc., Chiyoda-Ku (JP)

( * ) Notice: Subject to any disclaimer, the term of this patent is extended or adjusted under 35 U.S.C. 154(b) by 50 days.

(21) Appl. No.: 15/102,100

(22) PCT Filed: Dec. 9, 2014

(86) PCT No.: PCT/JP2014/082486
§ 371 (c)(1),
(2) Date: Jun. 6, 2016

(87) PCT Pub. No.: WO2015/093339
PCT Pub. Date: Jun. 25, 2015

(65) Prior Publication Data
US 2016/0303884 A1    Oct. 20, 2016

(30) Foreign Application Priority Data
Dec. 18, 2013 (JP) .................. 2013-261219

(51) Int. Cl.
*B41M 5/44* (2006.01)
*B32B 27/18* (2006.01)
(Continued)

(52) U.S. Cl.
CPC ............... *B41M 5/44* (2013.01); *B32B 27/08* (2013.01); *B32B 27/18* (2013.01); *B32B 27/20* (2013.01);
(Continued)

(58) Field of Classification Search
CPC ............... Y10T 428/25; Y10T 428/256; Y10T 428/31855; Y10T 428/31909;
(Continued)

(56) References Cited

U.S. PATENT DOCUMENTS 5,665,514 A * 9/1997 Shirai ............... B32B 27/08
428/316.6
5,670,448 A * 9/1997 Kometani ............... B32B 27/08
156/277

(Continued)

FOREIGN PATENT DOCUMENTS

EP    0 664 223 A1    7/1995
EP    1 493 560 A1    1/2005
(Continued)

OTHER PUBLICATIONS

International Search Report and Written Opinion (Application No. PCT/JP2014/082486) dated Jan. 13, 2015.
(Continued)

*Primary Examiner* — Betelhem Shewareged
(74) *Attorney, Agent, or Firm* — Burr & Brown, PLLC (57) ABSTRACT

A rear face side substrate for a thermal transfer image-receiving sheet has a first rear face side layer, a second rear face side layer, and a third rear face side layer layered in this order, wherein the first rear face side layer comprises a propylene-based polymer composition A containing at least a propylene-based polymer, the second rear face side layer comprises a propylene-based polymer composition B containing at least a propylene polymer, an antistatic agent and (Continued)

a masking agent, and the third rear face side layer comprises a propylene-based polymer composition (C) containing at least a propylene-based polymer, a three-dimensional center surface average roughness (SRa) of the third rear face side layer being in the range of 0.10 μm to 1.50 μm, and the first rear face side layer, the second rear face side layer and the third rear face side layer being biaxially oriented.

20 Claims, 1 Drawing Sheet

(51) Int. Cl.
    *B32B 27/32*     (2006.01)
    *B41M 5/41*     (2006.01)
    *B41M 5/42*     (2006.01)
    *B32B 27/08*     (2006.01)
    *B32B 27/20*     (2006.01)

(52) U.S. Cl.
    CPC ............... *B32B 27/32* (2013.01); *B41M 5/41* (2013.01); *B41M 5/42* (2013.01); *B32B 2264/102* (2013.01); *B32B 2307/21* (2013.01); *B32B 2307/518* (2013.01); *B41M 2205/02* (2013.01); *B41M 2205/32* (2013.01); *B41M 2205/36* (2013.01); *B41M 2205/38* (2013.01); *Y10T 428/25* (2015.01); *Y10T 428/31909* (2015.04); *Y10T 428/31913* (2015.04)

(58) Field of Classification Search
CPC ... Y10T 428/31913; B41M 5/44; B41M 5/41; B41M 5/42; B32B 27/18; B32B 27/32; B32B 27/08; B32B 27/20
See application file for complete search history.

(56) References Cited

U.S. PATENT DOCUMENTS

| | | | |
|---|---|---|---|
| 2001/0016557 A1* | 8/2001 | Takao | B41M 5/42 |
| | | | 503/227 |
| 2006/0121217 A1* | 6/2006 | Childs | B01D 67/0088 |
| | | | 428/34.1 |
| 2007/0104961 A1* | 5/2007 | Awaji | B32B 27/08 |
| | | | 428/423.1 |
| 2007/0154662 A1 | 7/2007 | Tanaka et al. | |
| 2009/0098364 A1 | 4/2009 | Honda et al. | |

FOREIGN PATENT DOCUMENTS

| | | |
|---|---|---|
| JP | 2009-083298 A1 | 4/2009 |
| JP | 2014-058139 A1 | 4/2014 |
| WO | 2005/063496 A1 | 7/2005 |
| WO | 2006/121217 A1 | 11/2006 |

OTHER PUBLICATIONS

Extended European Search Report (Application No. 14872625.0) dated Sep. 1, 2017.

* cited by examiner

REAR FACE SIDE SUBSTRATE FOR THERMAL TRANSFER IMAGE-RECEIVING SHEET, AND THERMAL TRANSFER SHEET

TECHNICAL FIELD

The present invention relates to a rear face side substrate for thermal transfer image-receiving sheet, and a thermal transfer image receiving sheet.

BACKGROUND ARTS

As a method for forming an image according to the thermal transfer, a sublimation type thermal transfer recording method is known, wherein a thermal transfer sheet in which sublimation type dyes as recording materials are supported on a substrate made of a plastic film or the like, and a thermal transfer image-receiving sheet in which a receiving layer is provided on another substrate made of a paper the like are superposed on each other in order to form a full color image. Since this method uses the sublimation type dyes as color materials, this method excels in reproducibility and gradation of halftone, and thus, a full-color image can be clearly expressed as the original image on the image-receiving sheet.

When a sublimation type thermal transfer printer for forming an image according to the sublimation thermal transfer method is used in order to form a full-color image on the thermal transfer image-receiving sheet, it is necessary to perform a plurality of times of printing on one screen, for example, three times of printing for Y (yellow), M (magenta), C (cyan) inks, or four times of printing for these inks and an additional protective layer (OP). In such a case, if the conveyance of the thermal transfer image-receiving sheet in the sublimation type thermal transfer printer becomes poor, deviations occur in the feed rate of the thermal transfer image-receiving sheet and in the attaching positions of the inks, and thereby, the turbulence is caused in the image. Therefore, good transportability at the time of image formation is required of the thermal transfer image-receiving sheet.

Under these circumstances, for example, in Patent Literature 1, a thermal transfer image-receiving sheet has been disclosed, which is provided with a rear face layer comprising a styrene-butadiene rubber having a glass transition temperature of 50-90° C., a polyethylene wax, and an anionic polystyrene resin.

Also recently, with respect to the thermal transfer image-receiving sheet for sublimation type thermal transfer printer applications, a high texture has been required in addition to the improvement of the transportability during the image formation. Specifically, not only for the image receiving face that is an image forming face of the thermal transfer image-receiving sheet, but also for the rear face side the high texture is required. Incidentally, in the thermal transfer image-receiving sheet, as a supporting member for supporting the receiving layer and the rear face side layer, a paper or plastic film or the like is generally used. However, since these supporting members tend to involve any contaminants or defects, in the case that the conventionally known rear face side substrate is simply provided on the surface of the supporting member that is opposite to the other surface on which the receiving layer is provided, it is impossible to cover up the contaminants or defects in the supporting member, and therefore, the thermal transfer sheet is obliged to be low in the texture of the rear face side thereof. As described in the Patent Literature 1, although a white opaque film or the like, which is prepared by adding white pigment or the like to the film material and then forming the film, is known as the supporting member of the thermal transfer image-receiving sheet, it is impossible to cover up the contaminants or defects in the supporting member completely by using such a white opaque film or the like. Thus, there is room for improvement in the concealment of the contaminants or defects. In addition, with respect to the rear face side of the thermal transfer image-receiving sheet, it is also required further improvement in the texture.

PRIOR ART DOCUMENTS

Patent Literature

Patent Literature 1: JP 2009-83298 A

SUMMARY OF THE INVENTION

Problems to be Solved by the Invention

The present invention is the one contrived in such a situation, and a main purpose of the present invention is to provide a rear face side substrate for thermal transfer image-receiving sheet, which is possible to improve the transportability of the thermal transfer image-receiving sheet, and to improve the texture of the rear face side of the thermal transfer image-receiving sheet, and provide a thermal transfer image-receiving sheet having the rear face side substrate for thermal transfer image-receiving sheet.

Means for Solving the Problems

The present invention for solving the above problems is embodied as a rear face side substrate for a thermal transfer image-receiving sheet, the rear face side substrate for the thermal transfer image-receiving sheet comprising a layered structure of a first rear face side layer, a second rear face side layer and the third rear face side layer layered in this order, wherein the first rear face side layer comprises a propylene-based polymer composition A containing at least a propylene-based polymer, the second rear face side layer comprises a propylene-based polymer composition B containing at least a propylene-based polymer, an antistatic agent and a masking agent, and the third rear face side layer comprises a propylene-based polymer C containing at least a propylene-based polymer, a three-dimensional center surface average roughness (SRa) of the third rear face side layer being in the range of from not less than 0.10 μm to not more than 1.50 μm, and the first rear face side layer, the second rear face side layer and the third rear face side layer being biaxially oriented.

Further, in the above invention, it is preferable that the masking agent is titanium oxide particles.

Further, in the above invention, it is preferable that the propylene-based polymer composition B includes the propylene-based polymer being in the range of from not less than 78% by weight to not more than 96.9% by weight, the antistatic agent being in the range of from not less than 0.1% by weight to not more than 2.0% by weight, and the masking agent being in the range of from not less than 3.0% by weight to not more than 20.0% by weight, based on the assumption that the total weight of the propylene-based polymer, the antistatic agent and the masking agent is 100% by weight.

Further, in the above invention, it is preferable that the propylene-based polymer composition C further comprises ethylene-based polymer, and the propylene-based polymer composition C includes the propylene-based polymer being in the range of from not less than 50% by weight to not more than 80% by weight, and the ethylene-based polymer being in the range of from not less than 20% by weight to not more than 50% by weight, based on the assumption that the total weight of the propylene-based polymer and the ethylene-based polymer is 100% by weight.

Further, in the above invention, it is preferable that the propylene-based polymer composition C further comprises a high density polyethylene and a low density polyethylene, and the propylene-based polymer composition C includes the propylene-based polymer being in the range of from not less than 55% by weight to not more than 80% by weight, the high density polyethylene being in the range of from not less than 5% by weight to not more than 25% by weight, and the low density polyethylene being in the range of from not less than 15% by weight to not more than 40% by weight, based on the assumption that the total weight of the propylene-based polymer, the high density polyethylene and the low density polyethylene is 100% by weight.

The present invention for solving the above problem is also embodied as a thermal transfer image-receiving sheet, the thermal transfer image-receiving sheet comprising a supporting member, a receiving layer provided on one surface of the supporting member, and a rear face side substrate provided on another surface of the supporting member, the rear face side substrate comprising a first rear face side layer, a second rear face side layer and the third rear face side layer layered in this order from the supporting member, and having the above characteristics.

Effect of the Invention

According to the rear face side substrate for thermal transfer image-receiving sheet of the present invention, it is possible to improve the transportability of the thermal transfer image-receiving sheet during the image formation, and it is possible to improve the texture of the printed article on which an image is formed. Further, according to the thermal transfer image-receiving sheet of the present invention, it is possible to improve the transportability during the image formation, it is possible to improve the texture of the printed matter on which an image is formed.

EMBODIMENTS FOR CARRYING OUT THE INVENTION

<<Rear Face Side Substrate for Thermal Transfer Image-Receiving Sheet>>

Figure 1:
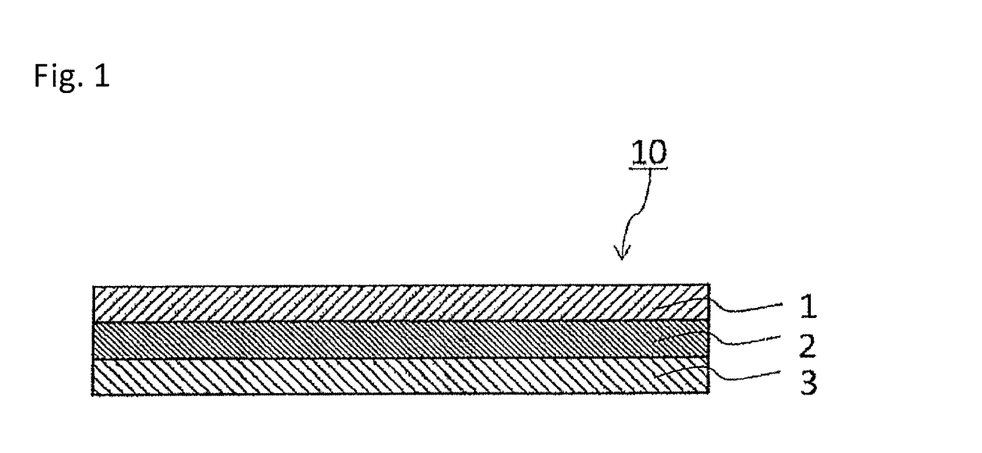
[FIG. 1] is a schematic sectional view showing an example of the rear face side substrate for thermal transfer image-receiving sheet according to the present invention of the present invention.

Now, the rear face side substrate for thermal transfer image-receiving sheet according to the present invention (hereinafter, it is referred to as the rear surface substrate of the present invention) will be described in detail with reference to FIG. 1. Here, FIG. 1 is a schematic sectional view of a rear face side substrate of the present invention. As shown in FIG. 1, the rear face side substrate 10 of the present invention takes a configuration comprising a first rear face side layer (1), a second rear face side layer (2), and a third rear face side layer (3), which are layered in this order. Next, each of the respective rear face side layers will be described concretely.

<Propylene-Based Polymer>

The first rear face side layer (1), the second rear face side layer (2), and the third rear face side layer (3) of the rear face side substrate 10 of the present invention comprises a propylene-based polymer composition (A), a propylene-based polymer composition (B), and a propylene-based polymer composition (C), respectively, wherein each individual composition includes at least a propylene-based polymer. Propylene based-polymer contained in each individual propylene-based polymer compositions is generally a polyolefin resin which is manufactured and marketed under the name of polypropylene, and which has usually a melting point 105-170° C., a density of 0.890-0.930 g/cm$^3$, MFR (melt flow rate; ASTM D 1238, Load 2160 g, temperature 230° C.) is 0.5-60 g/10 minutes, preferably, 0.5-10 g/10 minutes, and more preferably, 1-5 g/10 minutes, and which is a homopolymer of propylene, or a random copolymer of propylene and other monomer(s) in a small amount, for example, α-olefin(s) such as ethylene, 1-butene, 1-hexene, 1-octene, or the like, in an amount of not more than 10 mol %. These propylene-based polymers may be a composition consisting of one kind or two or more kinds of polymer(s), for example, may be a composition consisting of a propylene homopolymer and a propylene-α-olefin random copolymer, the molecular weights of which are different from each other.

With respect to the propylene-based polymer composition (A) constituting the first rear face side layer (1) of the rear face substrate 10 of the present invention, as well as the propylene-based polymer composition (B) constituting the second rear face side layer (2) of the rear face side substrate 10 of the present invention, it is preferable that a homopolymer of propylene, or a propylene random copolymer containing not more than 1 mol % of other comonomer and having high isotacticity, particularly, a homopolymer of propylene, and a propylene-α-olefin random copolymer containing not more than 1 mol % of α-olefin such as ethylene are included in each of these compositions. When the propylene-based polymer(s) as mentioned above is included in the propylene-based polymer composition (A) constituting the first rear face side layer (1) of the rear face side substrate 10 of the present invention, and the propylene-based polymer composition (B) constituting the second rear face side layer (2) of the rear face side substrate 10 of the present invention, it becomes possible to bring a high rigidity and an excellent heat resistance to the rear face side substrate 10 of the present invention.

(First Rear Face Side Layer)

With respect to the first rear face side layer (1) constituting the rear face side substrate for the thermal transfer image-receiving sheet of the present invention, when the rear face side substrate for the thermal transfer image-receiving sheet of the present invention and a supporting member one surface of which is provided with a receiving layer are layered together (stuck together) to be used as the thermal transfer image-receiving sheet, the first rear face side layer (1) is the layer which comes in contact with another surface of the supporting member. In the present invention, the first rear face side layer (1) is characterized in that it has been biaxially oriented, and that comprises a composition including at least the above mentioned propylene-based polymer [propylene-based polymer composition (A)].

The propylene-based polymer composition (A) constituting the first rear face side layer (1) may also contain optional component(s) within a range of not deviating from the object of the present invention, in addition to the propylene-based polymer as an essential component. As the optional component(s), any of various additives which are ordinary known to be added to polyolefin, such as, heat stabilizers, weathering stabilizers, ultraviolet absorbers, lubricants, nucleating agents, antiblocking agents, pigments, dyes, etc, and/or polymer(s) such as elastomers, for instance, ethylene-propylene random copolymer, ethylene-1-butene random copolymer, may be enumerated.

Although there is no particular limitation on the thickness of the first rear face side layer (1), it may be in the range of 1.0 µm-5.0 µm, and more preferably, in the range of 1.5 µm-3.5 µm.

(Second Rear Face Side Layer)

As shown in FIG. 1, the second rear face side layer (2) is provided between the first rear face side layer (1) and the third rear face side layer (3). The second rear face side layer (2) is characterized in that it has been biaxially oriented, and that it comprises the composition including at least an antistatic agent and a masking agent as well as the above mentioned propylene-based polymer [propylene-based polymer composition (B)].

The propylene-based polymer contained in the propylene-based polymer composition (B) may be the same polymer as the propylene-based polymer contained in the propylene-based polymer composition (A) constituting the first rear face side layer (1), or, it may be a different polymer. In addition, the propylene-based polymer contained in the propylene-based polymer composition (B) may be a propylene homopolymer, or a composition of a propylene homopolymer and a propylene-α-olefin random copolymer.

<Antistatic Agent>

In the propylene-based polymer composition (B) constituting the second rear face side layer (2), the antistatic agent is included as an essential component. The antistatic agent contained in the propylene-based polymer composition (B) will partially run out on the surface of the third rear face side layer (3) described later, and thus it can play a role in preventing the thermal transfer image-receiving sheet from a deviation, upon the image formation onto the receiving layer of the thermal transfer image-receiving sheet which has been provided with the rear face side substrate according to the present invention. In other words, it can play a role of improving the transportability of the thermal transfer image-receiving sheet. There is no particular limitation for the antistatic agent, it is possible to use various known antistatic agents. As such antistatic agents, for instance, various known antistatic agents, for example, alkyl amines and derivatives thereof, such as alkyl diethanol amine, alkyl diethanol amide, or alkyl diethanol amine fatty acid esters;

higher alcohols each having a carbon number of 8-18, such as lauryl alcohol, myristyl alcohol, cetyl alcohol, cetostearyl alcohol, stearyl alcohol or behenyl alcohol;

glycerol esters of higher fatty acids each having a carbon number of 8-24, such as palmitic acid, stearic acid, oleic acid, linoleic acid or linolenic acid;

partial fatty acid esters of polyhydric alcohols such as glycerin, ethylene glycol, propylene glycol or pentaerythritol, and surfactants such as non-ionic surfactants, cationic surfactants, anionic surfactants and amphoteric surfactants mentioned below, may be enumerated.

<<Nonionic Surfactants>>

As the nonionic surfactant, for example, ethylene oxide-added type nonionic surface active agents, such as, ethylene oxide adducts (number average molecular weight in the range of 150 to 200,000) of the higher alcohols as described above, higher fatty acids (8 to 24 carbon atoms) or a higher alkyl amine (8 to 24 carbon atoms) (number average molecular weight in the range of 150 to 200,000); higher fatty acid esters of polyalkylene glycols that are ethylene oxide adducts of glycol (number average molecular weight of 150 to 6,000); ethylene oxide adducts of di- to octa-hydric or further higher polyhydric alcohols or higher fatty acid esters, each having 2 to 18 carbon atoms, such as ethylene glycol, propylene glycol, glycerol, pentaerythritol and sorbitan (number average molecular weight in the range of 150 to 200,000); ethylene oxide adducts of higher fatty acid amides (number average molecular weight in the range of 200 to 30,000) and ethylene oxide adducts of polyhydric alcohol alkyl (3 to 60 carbon atoms) ethers (number average molecular weight in the range of 120 to 30,000);

fatty acid (3-60 carbon atoms) esters of polyhydric alcohols, and alkyl (3-60 carbon atoms) ethers of polyhydric alcohols;

polyhydric alcohols (3-60 carbon atoms) type non-ionic surface active agents such as fatty acid (3-60 carbon atoms) alkanol amides;

may be enumerated.

<<Anionic Surfactants>>

As the anionic surfactant, for example, salts, such as alkali metal salts, alkaline earth metal salts, ammonium salts, alkylamine (1 to 20 carbon atoms) salts and alkanolamine (2 to 12 carbon atoms, such as mono-, di- and tri-ethanolamine) salts of saturated or unsaturated fatty acids having 8 to 24 carbon atoms, such as palmitic acid, stearic acid, oleic acid, linoleic acid or linolenic acid, or, of higher fatty acids, such as ether carboxylic acids;

sulfuric acid ester salts, such as, sulfuric acid ester salts of the higher alcohols as mentioned above, and higher alkyl ether sulfuric ester salts, for instance, sulfuric acid ester salts of ethylene oxide (1-10 moles) adducts of the higher alcohols as mentioned above;

sulfonic acid ester salts having 10 to 20 carbon atoms, such as, alkyl benzene sulfonates, for instance, sodium dodecyl benzene sulfonate, etc., alkyl sulfonates, alkyl naphthalene sulfonates, dialkyl sulfosuccinic acid ester type, hydrocarbon (e.g., alkane, α-olefin) sulfonates and Igepon T type;

phosphoric acid ester salts, such as, phosphoric acid ester salts of the above mentioned higher alcohol ethylene oxide adducts, and phosphoric acid ester salts of alkyl (4 to 60 carbon atoms) phenol ethylene oxide adducts; etc., may be enumerated.

<<Cationic Surfactants>>

As the cationic surfactant, for example, quaternary ammonium salt type cationic surfactants: for instance, tetra-alkyl ammonium salts having a carbon number of 4 to 100, such as, lauryl trimethyl ammonium chloride, didecyl dimethyl ammonium chloride, dioctyl dimethyl ammonium bromide, and stearyl trimethyl ammonium bromide; trialkyl benzyl ammonium salts having a carbon number of 3 to 80, such as lauryl dimethyl benzyl ammonium chloride (benzalkonium chloride); alkyl pyridinium salts having a carbon number of 2 to 60, such as, cetyl pyridinium chloride;

polyoxyalkylene trialkyl ammonium salts having 2 to 4 carbon atoms, such as polyoxyethylene trimethyl ammonium chloride; and a sapamine type quaternary ammonium salts such as stearamide ethyldiethylmethyl ammonium methosulfate; and amine salt-type cationic surfactants:

for instance, salts of higher aliphatic amines having 12 to 60 carbon atoms, such as laurylamine, stearylamine, cetylamine, hydrogenated beef tallow amine, and rosin amine, with inorganic acids, such as, hydrochloric acid, sulfuric acid, nitric acid, and phosphoric acid, or organic acids having 2 to 22 carbon atoms, such as, acetic acid, propionic acid, lauric acid, oleic acid, benzoic acid, succinic acid, adipic acid, and azelaic acid; inorganic acid salts or organic acid salts, such as ethylene oxide adducts of aliphatic amines having a carbon number of 1 to 30; and inorganic acid salts or organic acid salts of tertiary amines having 3 to 30 carbon atoms, such as triethanolamine monostearate and stearamide ethyldiethylmethyl ethanol amine; etc.;

may be enumerated.

<<Amphoteric Surfactants>>

As the amphoteric surfactant, for example, amino acid type amphoteric surface active agents, such as sodium propionate of higher alkylamine having 8 to 24 carbon atoms;

betaine type amphoteric surfactants, such as alkyl dimethyl betaines having 12 to 18 carbon atoms;

sulfuric acid ester salt type amphoteric surfactants, such as sodium sulfate of higher alkyl amine having 8 to 24 carbon atoms and sodium sulfate of hydroxyethyl imidazoline;

sulfonic acid ester type amphoteric surfactants, such as pentadecyl sulfotaurine and imidazoline sulfonic acid; and phosphoric acid ester salt type amphoteric surfactants, such as amine phosphate salts of glycerin higher fatty acid ester products; etc.;

may be enumerated.

It should be noted the antistatic agent(s) contained in the propylene-based polymer composition (B) is not limited to those enumerated above, and any of various well-known antistatic agents may be used by selecting as appropriate. The antistatic agent (s) may be used as a single kind alone, or may also be used in combination of two or more kinds of antistatic agents. It is preferable that the propylene-based polymer composition (B) contains a mixture of alkylamine (s), glycerin ester(s) of higher fatty acid(s), and partial fatty acid ester(s) of polyhydric alcohols, among the above enumerated antistatic agents.

<Masking Agent>

The propylene-based polymer composition (B) constituting the second rear face side layer (2) includes a masking agent as an essential component. The concealment agent contained in the propylene-based polymer composition (B) is an additive that can reduce the transparency of the obtained film when blending it to the above mentioned propylene-based polymer, and never generate any void (cavity) in the film after undergoing biaxial orientation. Typically, as the masking agent, inorganic compounds in powder, organic compounds in powder or the like may be enumerated. Among these masking agents, minute particles having a powder particle size in the range of not more than 1 μm, such as calcium carbonate, clay (kaolin), calcined clay, talc, silica, zeolite, barium sulfate, aluminum sulfate, titanium oxide, etc., are desirable, preferably, the minute particles having a powder particle size in the range of 0.1 μm-0.5 μm, and more preferably, the minute particles having a powder particle size in the range of 0.2 μm-0.3 μm.

The titanium oxide is also known as titanium white, and it includes the rutile type and the anatase type. The rutile type is preferred, since masking effect thereof is larger. In addition, with respect to the titanium oxide that may be contained in the propylene-based polymer composition (B), it is preferable that the surface of the titanium oxide is alumina-treated. Furthermore, it is preferable that the whiteness of the titanium oxide is not less than 95%. When using the surface treated titanium oxide, it is possible to improve further the masking property of the obtained biaxially oriented multi-layered polypropylene film. Herein, the particle size of the titanium oxide is a particle diameter as measured by a light scattering method.

The second rear face side layer (2) is a layer which comprises a propylene-based polymer composition (B) containing the propylene-based polymer as mentioned above, the antistatic agent as mentioned above and the masking agent as mentioned above, and desirably, it includes the propylene-based polymer being in the range of from not less than 78% by weight to not more than 96.9% by weight, more preferably, in the range of from not less than 85% by weight to not more than 94% by weight; the antistatic agent being in the range of from not less than 0.1% by weight to not more than 2.0% by weight, more preferably, in the range of from not less than 0.8% by weight to not more than 1.8% by weight; and the masking agent being in the range of from not less than 3.0% by weight to not more than 20.0% by weight, more preferably, in the range of from not less than 5.0% by weight to not more than 15.0% by weight; based on the assumption that the total weight of the propylene-based polymer, the antistatic agent and the masking agent is 100% by weight. According to the rear face side substrate 10 of the present invention that is provided with the second rear face side layer (2) which comprises the propylene-based polymer composition (B) including the propylene-based polymer, the antistatic agent and the masking agent within the above mentioned respective amount ranges, it is possible to obtain an excellent transportability of the thermal transfer image-receiving sheet at the time of image formation on the thermal transfer image-receiving sheet comprising the rear face side substrate 10, and, it is possible to obtain a printing paper in which texture of printed matter on which an image is formed is excellent.

The propylene-based polymer composition (B) constituting the second rear face side layer (2) may also contain, as optional component(s), any of various additives which are ordinary known to be added to polyolefin, such as, heat stabilizers, weathering stabilizers, ultraviolet absorbers, lubricants, nucleating agents, antiblocking agents, pigments, dyes, etc, and/or polymer(s) such as elastomers, for instance, ethylene-propylene random copolymer, ethylene-1-butene random copolymer, within a range of not deviating from the object of the present invention, in addition to the propylene-based polymer, the antistatic agent and the masking agent as essential components.

Although there is no particular limitation on the thickness of the second rear face side layer (2), it may be in the range of 13.0 μm-40.0 μm, and more preferably, in the range of 14.0 μm-30.0 μm.

(Third Rear Face Side Layer)

As shown in FIG. 1, on the second rear face side layer (2), a third rear face side layer (3) is provided. The third rear face side layer (3) is characterized in that it has been biaxially oriented, and that comprises a composition including at least the above mentioned propylene-based polymer [propylene-based polymer composition (C)]. Further, the present invention is characterized in that roughness of a surface (the opposite side of another surface in contact with the second rear face side layer) of the third rear face side layer is in the range of from not less than 0.10 µm to not more than 1.50 µm.

According to the rear surface substrate 10 of the present invention that is provided with the third rear face side layer (3) having the above features, since the roughness of the surface of the third rear face side layer is set within the above mentioned range and thus the antistatic agent included in the second rear face side layer (2) is allowed to move to the surface of the third rear face side layer (3) as appropriate, it is possible to give an transporting force of the third rear face side layer (3). It is also possible to improve the appearance of the rear face side substrate for the thermal transfer image-receiving sheet so as to impart a quality appearance. With respect to the third rear face side layer (3) according to the present invention, when it is previously subjected to corona treatment, it becomes possible to easily migrate the antistatic agent blended in the second rear face side layer to the surface of the third rear face side layer (3), and thus, it is preferable. With respect to the roughness of the surface (the opposite side of another surface in contact with the second rear face side layer) of the third rear face side layer (3), although it is adequate as long as it satisfies the above condition of being in the range of from not less than 0.10 µm to not more than 1.50 µm, it is desirable to be in the range of from not less than 0.15 µm to not more than 0.50 µm, and more preferably, in the range of from not less than 0.20 µm to not more than 0.50 µm.

The roughness (µm) of the surface of the third rear face side layer (3), the surface not being in contact with the second rear face side layer, is determined by measuring a three-dimensional center surface average roughness (SRa) of the third rear face side layer in accordance with the method described in JIS B 0601 and with using a three-dimensional surface roughness measuring instrument (SE-30KS, manufactured by Kosaka Laboratory Ltd.) and an analyzer (TDA-21, manufactured by Kosaka Laboratory Ltd.), and employing the measured value as the roughness.

It is preferable that the propylene-based polymer composition (C) constituting the third back surface layer (3) contains ethylene-based polymer(s), particularly, high density polyethylene, and more desirably, high density polyethylene and low density polyethylene, in addition to the above mentioned propylene-based polymer. According to the propylene-based polymer composition (C) including ethylene-based polymer(s), particularly, high density polyethylene, and more desirably, high density polyethylene and low density polyethylene, it is possible to control the migrating amount of the antistatic agent contained in the second rear face side layer (2) to the surface of the third rear face side layer, and it is also possible to make relatively easily migrate the antistatic agent. Thus, it is possible to obtain the rear face side substrate for the thermal transfer image-receiving sheet with more excellent transportability, and it is possible to control easily the roughness of the surface of the third rear face side layer (3) within the above range.

In the case of using as propylene-based polymer composition (C) a composition which includes ethylene-based polymer in addition to the above mentioned propylene-based polymer, it is preferable that the propylene-based polymer composition (C) includes the propylene-based polymer being in the range of from not less than 50% by weight to not more than 80% by weight; and the ethylene-based polymer being in the range of from not less than 20% by weight to not more than 50% by weight, based on the assumption that the total weight of the propylene-based polymer and the ethylene-based polymer is 100% by weight.

In the case that the propylene-based polymer composition (C) includes the high density polyethylene and the low density polyethylene in addition to the above mentioned propylene-based polymer, it is preferable that the propylene-based polymer composition (C) includes the propylene-based polymer (b1) being in the range of from not less than 55% by weight to not more than 80% by weight; the high density polyethylene (b2) being in the range of from not less than 5% by weight to not more than 25% by weight; and the low density polyethylene (b3) being in the range of from not less than 15% by weight to not more than 40% by weight (where, b1+b2+b3=100% by weight); based on the assumption that the total weight of the propylene-based polymer, the high density polyethylene and the low density polyethylene is 100% by weight. Now, the high-density polyethylene, and the low-density polyethylene will be explained as below.

<High Density Polyethylene>

The high density polyethylene which may be optionally contained in the propylene-based polymer composition (C) involves ethylene homopolymer, and copolymers of ethylene and other α-olefin(s), such as, propylene, 1-butene, 1-pentene, 1-hexene, 1-octene, 4-methyl-1-pentene; typically, having a density of 0.945-0.970 g/cm$^3$, and which are manufactured and commercialized generally as high density polyethylene (HDPE), or are prepared in such a polymerization system. The high density polyethylenes typically have a peak temperature (Tp) as determined from the crystal melting curve based on DSC in the range of 120-138° C. In addition, although MFR (melt flow rate; ASTM D 1238, load: 2160 g, temperature: 190° C.) of the high density polyethylene is not particularly limited as long as the propylene-based polymer composition (C) in which the high density polyethylene is blended with the above mentioned propylene-based polymer and the low density polyethylene mentioned later can maintain film-forming ability, it is usually desirable to be in the range of 0.1-50 g/10 min, and more preferably, in the range of 0.2-35 g/10 min.

<Low Density Polyethylene>

The low density polyethylene which may be optionally contained in the propylene-based polymer composition (C) involves ethylene homopolymer, and copolymers of ethylene and other α-olefin(s), such as, propylene, 1-butene, 1-pentene, 1-hexene, 1-octene, 4-methyl-1-pentene; typically, having a density of 0.905-0.935 g/cm$^3$, and which are manufactured and commercialized generally as high pressure processed low density polyethylene (HP-LDPE) or linear low density polyethylene (LLDPE), or are prepared in such a polymerization system. The low density polyethylenes typically have a peak temperature (Tp) as determined from the crystal melting curve based on DSC in the range of 95-125° C. In addition, although MFR (melt flow rate; ASTM D 1238, load: 2160 g, temperature: 190° C.) of the low density polyethylene is not particularly limited as long as the propylene-based polymer composition (C) in which the low density polyethylene is blended with the above mentioned propylene-based polymer and the above mentioned high density polyethylene mentioned later can maintain film-forming ability, it is usually desirable to be in the range of 0.1-50 g/10 min, and more preferably, in the range of 0.2-35 g/10 min.

MFR (melt flow rate; ASTM D 1238, load: 2160 g, temperature: 190° C.) of the propylene-based polymer composition (C) constituting the third rear face side layer (3) is not particularly limited as long as it has a film-forming ability, it is usually desirable to be in the range of 0.5-20 g/10 min, more preferably, in the range of 2-10 g/10 min.

The propylene-based polymer contained in the propylene-based polymer composition (C) constituting the third rear face side layer (3) may be the same polymer as the propylene-based polymer contained in the propylene-based polymer composition (A) constituting the first rear face side layer (1), and the propylene-based polymer contained in the propylene-based polymer composition (B) constituting the second rear face side layer (2), or, it may be a different polymer. In addition, the propylene-based polymer contained in the propylene-based polymer composition (C) may be a composition of a propylene homopolymer and a propylene-α-olefin random copolymer.

In addition, the propylene-based polymer contained in the propylene-based polymer composition (C) constituting the third rear face side layer (3) may also contain, as optional component(s), any of various additives which are ordinary known to be added to polyolefin, such as, heat stabilizers, weathering stabilizers, ultraviolet absorbers, lubricants, nucleating agents, antiblocking agents, pigments, dyes, etc, and/or polymer(s) such as elastomers, for instance, ethylene-propylene random copolymer, ethylene-1-butene random copolymer, within a range of not deviating from the object of the present invention, in addition to the propylene-based polymer as the essential component and the high density polyethylene and the low density polyethylene added whenever the necessity arises.

Although there is no particular limitation on the thickness of the third rear face side layer (3), it may be in the range of 1.0 μm-5.0 μm, and more preferably, in the range of 1.5 μm-3.5 μm.

<Method of Manufacturing Rear Face Side Substrate for Thermal Transfer Image-Receiving Sheet>

The rear face side substrate for thermal transfer image-receiving sheet of the present invention may be obtained in accordance with various known methods, for example, by co-extruding the propylene-based polymer composition (B) which includes at least the propylene-based polymer, the antistatic agent and the masking agent and which will constitute the second rear face side layer (2), the propylene-based polymer composition (A) which includes at least the propylene-based polymer and which will constitute the first rear face side layer (1), and the propylene-based polymer composition (C) which includes at least the propylene-based polymer and which will constitute the third rear face side layer (3) so as to form a multi-layered film in which the first rear face side layer (1)/the second rear face side layer (2)/the third rear face side layer (3) are arranged in this order, and subjecting the multi-layered film to biaxial orientation in accordance with a known manufacturing method of biaxially oriented film such as a known simultaneous biaxial stretching method or a known sequential biaxial stretching method. As conditions of biaxial orientation, it is possible to adopt manufacturing conditions in the known biaxially oriented polypropylene, for example, in the sequential biaxial stretching method, the longitudinal stretching temperature of 100° C.-145° C. and the longitudinal stretching ratio in the range of 4- to 7-fold, the transverse stretching temperature of 150° C.-190° C. and the transverse stretching ratio in the range of 8- to 11-fold, may be adaptable.

<<Thermal Transfer Image-Receiving Sheet>>

Figure 2:
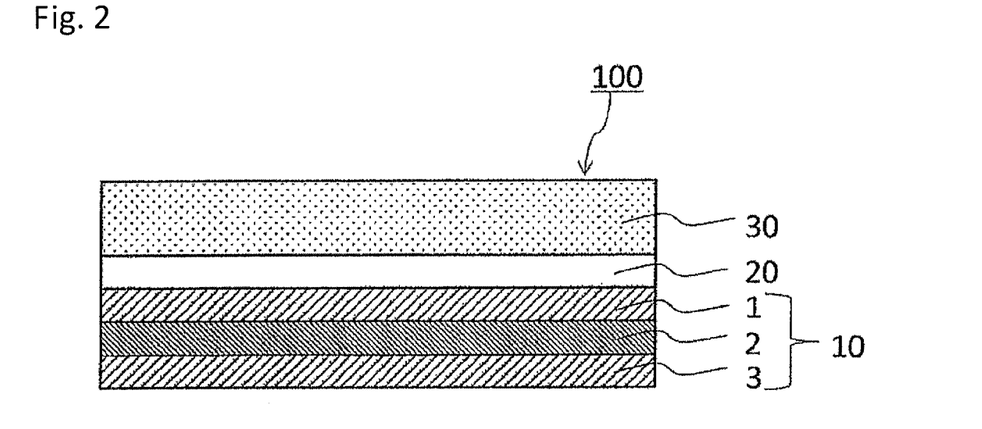
[FIG. 2] is a schematic sectional view showing an example of a thermal transfer image-receiving sheet according to the present invention.

Next, the thermal transfer image-receiving sheet of the present invention will be described in detail with reference to FIG. 2. FIG. 2 is a schematic sectional view of a thermal transfer image-receiving sheet of the present invention. As shown in FIG. 2, in the thermal transfer image-receiving sheet 100 of the present invention, the receiving layer 30 is provided on one surface of the supporting member 20, and the rear face side substrate 10 of the present invention as explained above is provided on another surface of the supporting member 20, so that the first rear face side layer (1), the second rear face side layer (2) and the third rear face side layer (3) are arranged in this order from the supporting member.

According to the thermal transfer image-receiving sheet of the present invention having the above structure, since the above described rear face side substrate 10 is provided on the rear face side of the supporting member 20, it is possible to prevent deviation of the thermal transfer image-receiving sheet when using the thermal transfer image-receiving sheet of the present invention and performing image formation on the receiving layer 30 by full-color printing or the like, and thus, it is possible to perform high-quality image formation.

Further, since the rear face side substrate 10 which includes the second rear face side layer (2) having a masking property is provided on the other surface of the supporting member 20, even when the supporting member 20 happens to include foreign matters, defects or the like, it is possible to conceal these defects, etc., by the rear face side substrate 10, and thus, it is possible to improve the texture of the thermal transfer image-receiving sheet.

Furthermore, with respect to the rear face side substrate 10, since the third rear face side layer (3) is provided so as to be disposed farthest from the supporting member 1, and the surface of the third rear face side layer (3) is defined so as to have a surface roughness (SRa) in the range of from not less than 0.10 μm to not more than 1.50 μm, it is possible to impart matte texture on the rear face side, and thus it is possible to further improve the texture.

Now, respective components of the thermal transfer image-receiving sheet 100 of the present invention will be described concretely.

(Supporting Member)

The supporting member 20 is not particularly limited as long as it can support receiving layer 30, and the rear face side substrate 10. As material of the supporting member 20, for instance, paper substrates, such as, plastic film substrate, high quality paper, coated paper, resin coated paper, art paper, cast coated paper, paperboard, synthetic paper (polyolefin-type, polystyrene-type), synthetic resin or emulsion-impregnated paper, synthetic rubber latex-impregnated paper, synthetic resin internally added paper, thereto, cellulose fiber paper, etc., may be enumerated. It is also possible to use layered product obtained by laminating any of these materials.

Although there is no particular limitation for thickness of the supporting member 20, it may be usually about 10 μm-300 μm, preferably, about 110 μm-140 μm.

(Adhesive Layer)

In order to improve the adhesiveness between the supporting member 20 and the rear face side substrate 10, an adhesive layer (not shown) may be provided between the supporting member 20 and the rear face side substrate 10.

As material of the adhesive layer, for example, urethane type resins, polyolefin type resins such as α-olefin-maleic anhydride resins, polyester type resin, acrylic resins, epoxy type resins, urea type resins, melamine type resins, phenolic resins, vinyl acetate type resins cyanoacrylate type resins, etc., may be enumerated. Among them, reactive type of or modified type of the acrylic resin can be preferably used. Further, when the adhesive agent is cured with a curing agent, adhesive force is improved, and heat resistance also increases, thus, such an embodiment is preferable. As the curing agent, although isocyanate compounds are generally used, aliphatic amines, cycloaliphatic amines, aromatic amines, acid anhydrides and the like can be also used.

(Receiving Layer)

On another surface of the supporting member 20 that is opposite to the surface on which the rear face side is provided, the receiving layer 30 is provided. The receiving layer 30 is an essential constituent of the thermal transfer image-receiving sheet 100 of the present invention.

As material for forming the receiving layer 30, it is possible to use any conventionally known resin material which can easily receive the heat transferable colorant, such as sublimable dye or thermally fusible ink. For example, polyolefin type resins such as polypropylene; halogenated resins such as polyvinyl chloride or polyvinylidene chloride; vinyl type resins such as polyvinyl acetate, vinyl chloride-vinyl acetate copolymer, ethylene-vinyl acetate copolymer, or polyacrylic ester; polyester resins such as polyethylene terephthalate or polybutylene terephthalate; polystyrene type resins; polyamide type resins; copolymer type resins of olefin(s), such as ethylene or propylene, and other vinyl monomer(s); ionomers or cellulose type resins such as cellulose diastase; polycarbonate and the like, may be enumerated. In particular, vinyl chloride type resin, acryl-styrene type resin or polyester resin is preferred.

Further, the receiving layer 30 may contain any of various additives such as releasing agent, in addition to the resin material.

The receiving layer 30 can be formed by dissolving or dispersing a material or plural materials selected from the above-mentioned materials, and optionally in combination with various additives, into an appropriate solvent such as water or an organic solvent in order to prepare a coating liquid for the receiving layer, coating thus prepared coating liquid for the receiving layer in accordance with a known procedure such as gravure printing method, screen printing method, or reverse-coating method using a gravure plate, etc., on the supporting member 20 or an arbitrary layer provided on the supporting member, and then drying the coated film. The thickness of the receiving layer 30 is usually about 1 $g/m^2$-10 $g/m^2$ in dried state.

As long as the present invention satisfies the conditions that the receiving layer 30 is provided on one surface of the supporting member 20 and the rear face side substrate 10 is provided on another surface of the supporting member 20, it is possible to provide any arbitrary layer(s) other than these layers. For instance, it is possible to provide a porous layer for imparting heat insulating properties and cushioning properties, and a barrier layer for preventing the porous layer from causing destruction by the solvent of the receiving layer, or the like, between the supporting member 20 and the receiving layer 20. In addition, between the supporting member 20 and the rear face side substrate 10, or on the rear face side substrate 10, it is possible to further provide any separate layer(s).

EXAMPLES

Next, the present invention will be described more concretely with demonstrating examples. It should be noted, however, the present invention is not limited to the described examples at all as long as it does not deviate from the spirit and/or the scope of the present invention.

Physical properties, etc. in the examples and comparative examples were determined by the following evaluation methods.

(1) Density ($g/cm^3$)

Density was calculated by measuring the thickness of the rear face side substrate for the thermal transfer image-receiving sheet and the film weight per 1 $m^2$ of the substrate.

(2) Total Light Transmittance (%)

Total light transmittance of the rear face side substrate for the thermal transfer image-receiving sheet was measured by using HazeMeter (VGS-1D-300A, manufactured by Nippon Denshoku Industries Co., Ltd.), and carrying out the test in accordance with JIS K 7105 so as to measure the total light transmittance of one sheet of the rear face side substrate for the thermal transfer image receiving sheet. The obtained results are shown in Table 1.

Propylene-based polymer, etc., used in the examples and comparative examples are shown below.

<First Rear Face Side Layer (1)>

(1) Propylene-Based Polymer (1-1) propylene homopolymer (PP-1): melting point=160° C., MFR=3.0 g/10 minutes (1-2) propylene-α-olefin random copolymer (PP-2): melting point=106° C., MFR=6.0 g/10 minutes <Second Rear Face Side Layer (2)>

(1) Propylene-Based Polymer (1-1) propylene homopolymer (PP-1): melting point=160° C., MFR=3.0 g/10 minutes.

(2) Antistatic Agent

As an antistatic agent, a mixture of an alkylamine, a glycerin ester of higher fatty acid and a partial fatty acid ester of polyhydric alcohol was used.

(3) Masking Agent (3-1) Titanium Oxide

Alumina treated rutile type titanium oxide powder having an average particle size of 0.2 and a moisture content of not more than 400 ppm (determined by Karl Fischer method, at 200° C.)

<Third Rear Face Side Layer (3)>

(1) Propylene-Based Polymer (1-1) propylene homopolymer (PP-1): melting point=160° C., MFR=3.0 g/10 minutes.

(1-2) propylene-ethylene-1-butene random copolymer (PP-4): melting point=139.7° C., MFR=7 g/10 minutes (2) high density polyethylene (PE-1): MFR=0.33 g/10 minutes, density=0.964 $g/cm^3$, Tp=128.1° C.

(3) high pressure processed low density polyethylene (PE-2): MFR=0.35 g/10 minutes, density: 0.919 $g/cm^3$, Tp=109.8° C.

(4) Propylene-Based Polymer Composition (C-1)

As the third rear face side layer (3), a propylene-based polymer composition (C-1) including said PP-1: 40% by weight, PP-4: 20% by weight, PE-1: 10% by weight, and PE-2: 30% by weight [PP-1+PP-4+PE-1+PE-2=100% by weight] was used.

Example 1

Using said PP-1 as the first rear face side layer; a propylene-based polymer composition (B-1) which includes said PP-1=91.8% by weight, said mixture as an antistatic agent=1.0% by weight, and said titanium oxide as masking agent=7.2% by weight [PP-1+anti-static agent mixture+titanium oxide=100% by weight] as the second rear face side layer; and said propylene-based polymer composition (C-1) as the third rear face side layer; melt-extruding these compositions by using their respective screw extruders so as to satisfy an extrusion amount ratio (first rear face side layer/second rear face side layer/third rear face side layer: 0.7/8.6/0.7), and extruding them through a multi-manifold type T– die; and thereafter, quenching the coextruded product on a chill roller, a multi-layered sheet having a thickness of 1.5 mm was obtained. The resulting multi-layered sheet was then heated at 120° C. and stretched 5-fold in the sheet flow direction (longitudinal direction) and then, the 5-fold stretched sheet was heated at 165° C. and stretched 10-fold in the direction perpendicular to the flow direction (transverse direction), in order to obtain a rear face side substrate for thermal transfer image-receiving sheet of Example 1 which comprises a biaxially oriented polypropylene multilayer film, in which the thickness of the first rear face side layer=2 μm, the thickness of the second rear face side layer=26 μm, and the thickness of the third rear face side layer=2 μm (total thickness=30 μm). Incidentally, the surface of the first rear face side layer and the surface of the third rear face side layer in the resulting rear face side substrate for thermal transfer image-receiving sheet were subjected to corona treatment. The physical properties of the rear face side substrate for thermal transfer image-receiving sheet of Example 1 were measured in accordance with the above mentioned methods. The evaluation results are shown in Table 1. With respect to the rear face side substrates for thermal transfer image-receiving sheet of the following Examples 2 to 6, and Comparative Examples 1 to 3, their physical properties were also determined by the same procedures.

Example 2

A rear face side substrate for thermal transfer image-receiving sheet of Example 2 was obtained by carrying out the same procedure in Example 1 except that the PP-1 used in the first rear face side layer in Example 1 was replaced by the PP-2, and the propylene-based polymer composition (B-1) used in the second rear face side layer was replaced by a propylene-based polymer composition (B-2) which includes said PP-1=89.7% by weight, said mixture as an antistatic agent=1.3% by weight, and said titanium oxide as masking agent=9.0% by weight [PP-1+anti-static agent mixture+titanium oxide=100% by weight].

Example 3

As the second rear layer, a propylene-based polymer composition (B-3) which includes said PP-1=87.0% by weight, said mixture as an antistatic agent=1.0% by weight, and said titanium oxide as masking agent=12.0% by weight [PP-1+anti-static agent mixture+titanium oxide=100% by weight] was used instead of the propylene-based polymer composition (B-1) used in the second rear side layer of Example 1. The respective compositions were melt-extruded by using their respective screw extruders so as to satisfy an extrusion amount ratio (first rear face side layer/second rear face side layer/third rear face side layer: 0.7/8.3/1.0), and extruded through a multi-manifold type T– die. Thereafter, the coextruded product was quenched on a chill roller in order to obtain a multi-layered sheet having a thickness of 1.5 mm. The resulting multi-layered sheet was then heated at 120° C. and stretched 5-fold in the sheet flow direction (longitudinal direction) and then, the 5-fold stretched sheet was heated at 165° C. and stretched 10-fold in the direction perpendicular to the flow direction (transverse direction), in order to obtain a rear face side substrate for thermal transfer image-receiving sheet of Example 3 which comprises a biaxially oriented polypropylene multilayer film, in which the thickness of the first rear face side layer=2 μm, the thickness of the second rear face side layer=25 μm, and the thickness of the third rear face side layer=3 μm (total thickness=30 μm). Incidentally, the surface of the first rear face side layer and the surface of the third rear face side layer in the resulting rear face side substrate for thermal transfer image-receiving sheet were subjected to corona treatment.

Example 4

A rear face side substrate for thermal transfer image-receiving sheet of Example 4 was obtained by carrying out the same procedure in Example 1 except that the propylene-based polymer composition (B-1) used in the second rear face side layer of Example 1 was replaced by a propylene-based polymer composition (B-4) which includes said PP-1=91.2% by weight, said mixture as an antistatic agent=1.0% by weight, and said titanium oxide as masking agent=7.8% by weight [PP-1+anti-static agent mixture+titanium oxide=100% by weight].

Example 5

A rear face side substrate for thermal transfer image-receiving sheet of Example 5 was obtained by carrying out the same procedure in Example 1 except that the PP-1 used in the first rear face side layer in Example 1 was replaced by the PP-2, and the propylene-based polymer composition (B-1) used in the second rear face side layer was replaced by a propylene-based polymer composition (B-5) which includes said PP-1=91.4% by weight, said mixture as an antistatic agent=1.0% by weight, and said titanium oxide as masking agent=7.6% by weight [PP-1+anti-static agent mixture+titanium oxide=100% by weight].

Example 6

A rear face side substrate for thermal transfer image-receiving sheet of Example 6 was obtained by carrying out the same procedure in Example 5 except that the propylene-based polymer composition (B-5) used in the second rear face side layer of Example 5 was replaced by a propylene-based polymer composition (B-6) which includes said PP-1=90.9% by weight, said mixture as an antistatic agent=1.5% by weight, and said titanium oxide as masking agent=7.6% by weight [PP-1+anti-static agent mixture+titanium oxide=100% by weight].

Comparative Example 1

A rear face side substrate for thermal transfer image-receiving sheet of Comparative Example 1 was obtained by carrying out the same procedure in Example 1 except that the PP-1 used in the first rear face side layer in Example 1 was replaced by the above mentioned propylene-based polymer composition (C1) in the first rear face side layer, and the propylene-based polymer composition (B-1) used in the second rear face side layer was replaced by a propylene-based polymer composition (B-7) which includes said PP-1=99.0% by weight, and said mixture as an antistatic agent=1.0% by weight [PP-1+anti-static agent mixture=100% by weight] as the second rear face side layer.

Comparative Example 2

A rear face side substrate for thermal transfer image-receiving sheet of Comparative Example 2 was obtained by carrying out the same procedure in Example 3 except that the propylene-based polymer composition (B-3) used in the second rear face side layer of Example 3 was replaced by a propylene-based polymer composition (B-8) which includes said PP-1=88.0% by weight, and said titanium oxide as masking agent=12.0% by weight [PP-1+titanium oxide=100% by weight] as the second rear face side layer.

Comparative Example 3

A rear face side substrate for thermal transfer image-receiving sheet of Comparative Example 3 was obtained by carrying out the same procedure in Example 2 except that the propylene-based polymer composition (C-1) used in the third rear face side layer of Example 2 was replaced by said PP-1 as the third rear face side layer.

(Preparation of the Thermal Transfer Image-Receiving Sheet)

On the first rear face side layer of each rear face side substrate for the thermal transfer image-receiving sheet of Examples and Comparative Examples prepared as above, a coating liquid for adhesive layer having the following composition was coated by the gravure reverse coating method, and then the coated liquid was dried in order to form an adhesive layer A. The rear face side substrate was put on a coated paper (130 μm in thickness, manufactured by Mitsubishi Paper Mills Co., Ltd., trade name: Pearl Coat 157) so that the adhesive layer A faced one surface of the coated paper. Next, on one surface of a porous polyethylene film (Toyopearl-SS P4255, manufactured by Toyobo Co., Ltd., 35 μm in thickness) porous polyethylene film layer, a coating liquid for intermediate layer and a coating liquid for receiving layer having the following respective compositions were coated by the gravure reverse coating method and dried in succession in order to form an intermediate layer and a receiving layer. Then, on another surface of the porous polyethylene film, the coating liquid for adhesive layer having the following composition was coated by the gravure reverse coating method, and then the coated liquid was dried in order to form an adhesive layer B. The porous polyethylene film was put on the coated paper so that the adhesive layer B faced another surface of the coated paper. After all, each thermal transfer image-receiving sheet of Examples and Comparative Examples was prepared, wherein the third rear face side layer/the second rear face side layer/the first rear face side layer/the adhesive layer A/the coated paper/the adhesive layer B/the porous polyethylene film layer/the intermediate layer/the receiving layer were layered in this order. The coating amounts of the respective layers as above mentioned were, 1.5 g/m² for the intermediate layer, 5.0 g/m² for the receiving layer, and 5 g/m² for each of the adhesive layers A and B, in the dried state, respectively.

(Coating Liquid for Intermediate Layer)

| | |
|---|---|
| Polyester resin (POLYESTER-WR-905, manufactured by Nippon Synthetic Chemical Industry Co., Ltd.) | 50 parts |
| Titanium oxide (TCA888, manufactured by Tochem Products) | 20 parts |
| Fluorescent whitening agent (Uvitex BAC, manufactured by Ciba Specialty Chemicals Inc.) | 1.2 parts |
| Water/isopropyl alcohol = 1/1 | 28.8 parts |

(Coating liquid for receiving layer)

| | |
|---|---|
| Vinyl chloride - vinyl acetate copolymer (SOLBIN C, manufactured by Nissin Chemical Industry Co., Ltd.)) | 60 parts |
| Epoxy - modified silicone (X-22-3000T, manufactured by Shin-Etsu Chemical Co., Ltd.) | 1.2 parts |

-continued

| | |
|---|---|
| Metylstyl - modified silicone (X-24-510, manufactured by Shin-Etsu Chemical Co., Ltd.) | 0.6 parts |
| Methyl ethyl ketone/toluene (mass ratio 1:1) | 5 parts |

(Coating Liquid for Adhesive Layer)

| | |
|---|---|
| Urethane resin (TAKELAC A-969V, manufactured by Mitsui Takeda Chemical Inc.) | 30 parts |
| Isocyanate (TAKENATE, manufactured by Mitsui Takeda Chemical Inc.) | 10 parts |
| Ethyl acetate | 60 parts |

(Evaluation of Conveyance Force)

Each thermal transfer image-receiving sheet of Examples and Comparative Examples obtained above was measured for coefficient of dynamic friction, and evaluated in the conveyance force under the following evaluation criteria. The coefficient of dynamic friction was determined by: fixing each thermal transfer image-receiving sheet of Examples and Comparative Examples, which was cut to an area of 5 cm×5 cm in advance, on the stage of HEIDON SURFACE PROPERTY TESTER TYPE: 14DR (manufactured by Shinto Kagaku Co., Ltd.), pressing it with a transfer roller of a thermal transfer printer (sublimation transfer printer, model: DR200, manufactured by Sony Corp.) with applying a load of 1 kg, and moving the stage at 150 mm per minute. The evaluation results it is shown in Table 1.

<Evaluation Criteria>

◯: The coefficient of dynamic friction was not less than 0.40.

x: The coefficient of dynamic friction was less than 0.40.

(Evaluation of Concealing Property)

Each thermal transfer image-receiving sheet of Examples and Comparative Examples obtained above was evaluated in the concealing property under the following evaluation criteria. The evaluation results are shown in Table 1. The evaluation of concealing property of each thermal transfer image-receiving sheet of Examples and Comparative Examples was determined on the basis of the total light transmittance (%) of each surface substrate for thermal transfer image-receiving sheet which constitutes individual thermal transfer sheet of Example or Comparative Example. The total light transmittance (%) of each surface substrate for thermal transfer image-receiving sheet is as shown in Table 1.

<Evaluation Criteria>

◯: The total light transmittance is not more than 40% or less.

x: The total light transmittance is greater than 40%.

(Evaluation of Texture)

The glossiness of the third rear face side layer side of each thermal transfer image-receiving sheet of Examples and Comparative Examples obtained above was measured by using HazeMeter (VG7000, manufactured by Nippon Denshoku Industries Co., Ltd.), and carrying out the test in accordance with JIS K 7105 at an incident angle 60°, and the evaluation of texture was made under the following evaluation criteria. The evaluation results are shown in Table 1.

<Evaluation Criteria>

◯: The glossiness of the third rear face side layer side is not more than 25.

x: The glossiness of the third rear face side layer side is greater than 25.

TABLE 1

| | Density (g/cm³) | Total light transmittance (%) | Surface roughness (SRa) (μm) | Conveynance force | Concealing property | Texture |
|---|---|---|---|---|---|---|
| Example 1 | 0.912 | 36.3 | 0.237 | ○ | ○ | ○ |
| Example 2 | 0.921 | 33.2 | 0.233 | ○ | ○ | ○ |
| Example 3 | 0.895 | 24.5 | 0.981 | ○ | ○ | ○ |
| Example 4 | 0.904 | 35.3 | 0.251 | ○ | ○ | ○ |
| Example 5 | 0.916 | 36.3 | 0.225 | ○ | ○ | ○ |
| Example 6 | 0.916 | 36 | 0.229 | ○ | ○ | ○ |
| Comparative Example 1 | 0.827 | 94.7 | 0.397 | ○ | X | ○ |
| Comparative Example 2 | 0.884 | 28.5 | 1.089 | X | ○ | ○ |
| Comparative Example 3 | 0.921 | 33.2 | 0.064 | X | ○ | X |

EXPLANATION OF THE NUMERALS

10 . . . rear face side substrate
1 . . . first rear face side layer
2 . . . second rear face side layer
3 . . . third rear face side layer
100 . . . thermal transfer image-receiving sheet
20 . . . supporting member
30 . . . receiving layer

The invention claimed is:

1. A rear face side substrate for a thermal transfer image receiving sheet, comprising:
a layered structure of a first rear face side layer, a second rear face side layer and the third rear face side layer layered in this order,
the first rear face side layer comprising a propylene-based polymer composition A containing at least a propylene-based polymer,
the second rear face side layer comprising a propylene-based polymer composition B containing at least a propylene-based polymer, an antistatic agent and a masking agent, and
the third rear face side layer comprising a propylene-based polymer composition C containing at least a propylene-based polymer, a three-dimensional center surface average roughness (SRa) of the third rear face side layer being in the range of from not less than 0.10 μm to not more than 1.50 μm, and
the first rear face side layer, the second rear face side layer and the third rear face side layer being biaxially oriented.

2. The rear face side substrate for a thermal transfer image receiving sheet according to claim 1, wherein the masking agent comprises titanium oxide particles.

3. The rear face side substrate for a thermal transfer image receiving sheet according to claim 1,
wherein the propylene-based polymer composition B includes
the propylene-based polymer being in the range of from not less than 78% by weight to not more than 96.9% by weight,
the antistatic agent being in the range of from not less than 0.1% by weight to not more than 2.0% by weight, and
the masking agent being in the range of from not less than 3.0% by weight to not more than 20.0% by weight,
based on the assumption that the total weight of the propylene-based polymer, the antistatic agent and the masking agent is 100% by weight.

4. The rear face side substrate for a thermal transfer image receiving sheet according to claim 1,
wherein the propylene-based polymer composition C further comprises ethylene-based polymer, and
the propylene-based polymer composition C includes
the propylene-based polymer being in the range of from not less than 50% by weight to not more than 80% by weight, and
the ethylene-based polymer being in the range of from not less than 20% by weight to not more than 50% by weight,
based on the assumption that the total weight of the propylene-based polymer and the ethylene-based polymer is 100% by weight.

5. The rear face side substrate for a thermal transfer image receiving sheet according to claim 1,
wherein the propylene-based polymer composition C further comprises a high density polyethylene and a low density polyethylene, and
the propylene-based polymer composition C includes
the propylene-based polymer being in the range of from not less than 55% by weight to not more than 80% by weight,
the high density polyethylene being in the range of from not less than 5% by weight to not more than 25% by weight, and
the low density polyethylene being in the range of from not less than 15% by weight to not more than 40% by weight,
based on the assumption that the total weight of the propylene-based polymer, the high density polyethylene and the low density polyethylene is 100% by weight.

6. A thermal transfer image-receiving sheet, comprising:
a supporting member, a receiving layer provided on one surface of the supporting member, and
a rear face side substrate according to claim 1, provided on another surface of the supporting member, the first rear face side layer, the second rear face side layer and the third rear face side layer of the rear face side substrate being arranged in this order from the supporting member.

7. The rear face side substrate for a thermal transfer image receiving sheet according to claim 2,
wherein the propylene-based polymer composition B includes
the propylene-based polymer being in the range of from not less than 78% by weight to not more than 96.9% by weight,
the antistatic agent being in the range of from not less than 0.1% by weight to not more than 2.0% by weight, and the masking agent being in the range of from not less than 3.0% by weight to not more than 20.0% by weight,
based on the assumption that the total weight of the propylene-based polymer, the antistatic agent and the masking agent is 100% by weight.

8. The rear face side substrate for a thermal transfer image receiving sheet according to claim 2,
wherein the propylene-based polymer composition C further comprises ethylene-based polymer, and
the propylene-based polymer composition C includes
the propylene-based polymer being in the range of from not less than 50% by weight to not more than 80% by weight, and
the ethylene-based polymer being in the range of from not less than 20% by weight to not more than 50% by weight,
based on the assumption that the total weight of the propylene-based polymer and the ethylene-based polymer is 100% by weight.

9. The rear face side substrate for a thermal transfer image receiving sheet according to claim 7,
wherein the propylene-based polymer composition C further comprises ethylene-based polymer, and
the propylene-based polymer composition C includes
the propylene-based polymer being in the range of from not less than 50% by weight to not more than 80% by weight, and
the ethylene-based polymer being in the range of from not less than 20% by weight to not more than 50% by weight,
based on the assumption that the total weight of the propylene-based polymer and the ethylene-based polymer is 100% by weight.

10. The rear face side substrate for a thermal transfer image receiving sheet according to claim 2,
wherein the propylene-based polymer composition C further comprises a high density polyethylene and a low density polyethylene, and
the propylene-based polymer composition C includes
the propylene-based polymer being in the range of from not less than 55% by weight to not more than 80% by weight,
the high density polyethylene being in the range of from not less than 5% by weight to not more than 25% by weight, and
the low density polyethylene being in the range of from not less than 15% by weight to not more than 40% by weight,
based on the assumption that the total weight of the propylene-based polymer, the high density polyethylene and the low density polyethylene is 100% by weight.

11. The rear face side substrate for a thermal transfer image receiving sheet according to claim 7,
wherein the propylene-based polymer composition C further comprises a high density polyethylene and a low density polyethylene, and
the propylene-based polymer composition C includes
the propylene-based polymer being in the range of from not less than 55% by weight to not more than 80% by weight,
the high density polyethylene being in the range of from not less than 5% by weight to not more than 25% by weight, and
the low density polyethylene being in the range of from not less than 15% by weight to not more than 40% by weight,
based on the assumption that the total weight of the propylene-based polymer, the high density polyethylene and the low density polyethylene is 100% by weight.

12. A thermal transfer image-receiving sheet, comprising:
a supporting member, a receiving layer provided on one surface of the supporting member, and
a rear face side substrate according to claim 2, provided on another surface of the supporting member, the first rear face side layer, the second rear face side layer and the third rear face side layer of the rear face side substrate being arranged in this order from the supporting member.

13. A thermal transfer image-receiving sheet, comprising:
a supporting member, a receiving layer provided on one surface of the supporting member, and
a rear face side substrate according to claim 3, provided on another surface of the supporting member, the first rear face side layer, the second rear face side layer and the third rear face side layer of the rear face side substrate being arranged in this order from the supporting member.

14. A thermal transfer image-receiving sheet, comprising:
a supporting member, a receiving layer provided on one surface of the supporting member, and
a rear face side substrate according to claim 4, provided on another surface of the supporting member, the first rear face side layer, the second rear face side layer and the third rear face side layer of the rear face side substrate being arranged in this order from the supporting member.

15. A thermal transfer image-receiving sheet, comprising:
a supporting member, a receiving layer provided on one surface of the supporting member, and
a rear face side substrate according to claim 5, provided on another surface of the supporting member, the first rear face side layer, the second rear face side layer and the third rear face side layer of the rear face side substrate being arranged in this order from the supporting member.

16. A thermal transfer image-receiving sheet, comprising:
a supporting member, a receiving layer provided on one surface of the supporting member, and
a rear face side substrate according to claim 7, provided on another surface of the supporting member, the first rear face side layer, the second rear face side layer and the third rear face side layer of the rear face side substrate being arranged in this order from the supporting member.

17. A thermal transfer image-receiving sheet, comprising:
a supporting member, a receiving layer provided on one surface of the supporting member, and
a rear face side substrate according to claim 8, provided on another surface of the supporting member, the first rear face side layer, the second rear face side layer and the third rear face side layer of the rear face side substrate being arranged in this order from the supporting member.

18. A thermal transfer image-receiving sheet, comprising:
a supporting member, a receiving layer provided on one surface of the supporting member, and
a rear face side substrate according to claim 9, provided on another surface of the supporting member, the first rear face side layer, the second rear face side layer and the third rear face side layer of the rear face side substrate being arranged in this order from the supporting member.

19. A thermal transfer image-receiving sheet, comprising:
a supporting member, a receiving layer provided on one surface of the supporting member, and
a rear face side substrate according to claim 10, provided on another surface of the supporting member, the first rear face side layer, the second rear face side layer and the third rear face side layer of the rear face side substrate being arranged in this order from the supporting member.

20. A thermal transfer image-receiving sheet, comprising:
a supporting member, a receiving layer provided on one surface of the supporting member, and
a rear face side substrate according to claim 11, provided on another surface of the supporting member, the first rear face side layer, the second rear face side layer and the third rear face side layer of the rear face side substrate being arranged in this order from the supporting member.

\* \* \* \* \*